United States Patent [19]

Lenhard-Lubeseder et al.

[11] Patent Number: 5,616,302
[45] Date of Patent: Apr. 1, 1997

[54] PROCESS FOR RENDERING REACTORS INERT

[75] Inventors: Ulrich Lenhard-Lubeseder, Krefeld; Joerg Loehning, Duisburg; Franz Luerken, Kempen, all of Germany

[73] Assignee: Messer Griesheim GmbH, Germany

[21] Appl. No.: 420,863

[22] Filed: Apr. 12, 1995

[30] Foreign Application Priority Data

Apr. 15, 1994 [DE] Germany ............ 44 13 074.0

[51] Int. Cl.$^6$ .............. G05B 9/05; G05D 7/00; B65D 90/44
[52] U.S. Cl. .............. 422/117; 422/110; 48/192; 220/88.3
[58] Field of Search .............. 422/114, 115, 422/117, 168, 110, 111; 48/192; 220/88.3; 241/31

[56] References Cited

U.S. PATENT DOCUMENTS

| | | | |
|---|---|---|---|
| 2,881,057 | 4/1959 | Cole | 422/117 |
| 3,628,758 | 12/1971 | Nichols | 244/135 |
| 3,777,928 | 12/1973 | Kober | 48/190 |
| 5,220,799 | 6/1993 | Lievens et al. | 220/88.3 |

FOREIGN PATENT DOCUMENTS 3914783  8/1990  Germany.

*Primary Examiner*—Robert J. Warden
*Assistant Examiner*—E. Leigh Dawson

[57] ABSTRACT

In chemical production processes having flammable substances in a reactor (1), the reactor is rendered inert by feeding an inert gas, while headspace gas is removed from the headspace of the reactor. This inert-rendering must also be maintained if the reactor must be opened during the production process. Even when inert gas locks (3) are used, the inert-rendering can only be reliably maintained in this case with a complex instrumental determination of the oxygen content in the reactor. This expense can be avoided by establishing and maintaining a certain difference between inert gas flowrate and head-space gas flowrate removed in a defined manner, which difference is specific to the particular production factors and is determined in advance.

5 Claims, 2 Drawing Sheets

PROCESS FOR RENDERING REACTORS INERT

BACKGROUND OF THE INVENTION

The invention relates to a process for rendering inert reactors which contain flammable substances and which are open at least temporarily.

In chemical manufacturing processes in reactors in which flammable substances are situated, the reactor interior is rendered inert. When the reactor is opened, for example in order to charge solids, the oxygen-containing external air can penetrate into the reactor. In order to avoid this penetration of oxygen or to ward off its consequences, various procedures are employed.

In the simplest case, the moments of risk which arise during opening and charging are ignored and, after the reactor cover has been closed, inert-rendering is carried out again if appropriate. It is more effective to feed inert gas during the period of the opening and charging operations. For this purpose so-called inert gas locks are also sometimes used. The inert gas feed usually causes gas exit from the filler opening which prevents entry of air. Inert-rendering is also carried out in this case after the cover has been closed if appropriate. It is safest to measure the residual content of oxygen in the reactor continuously and thus initiate the addition of inert gas through the existing inert-rendering line.

All these processes have disadvantages. Thus the first-mentioned procedure is of concern for safety reasons. In the other two procedures, considerable amounts of flammable vapors are discharged and form an explosion risk or health risk for the handlers. Moreover, fine-grained bulk material can be swirled up against the fall direction and discharged. This can also be a safety or health risk, or at least the production hall is contaminated in an undesirable manner as a result. Moreover, the discharge of vapors and dusts represents an economic loss. Although measurement of the oxygen with the controlling of the inert gas feed associated therewith is highly effective and does not comprise a safety risk, it is so expensive that many operating companies dispense with the procurement thereof.

SUMMARY OF THE INVENTION

The object underlying the invention is to provide a process for rendering inert reactors which contain flammable substances and are open at least temporarily, which process gives no cause for concern with respect to safety, succeeds without loss of operating materials and does not demand high procurement costs.

The invention is based on the surprising finding that when a lock is used in the reactor, in the open state a constant residual oxygen content is established which depends exclusively on the difference between the flow-rate of inert gas fed through the inert gas lock and the flowrate of the headspace gas constantly taken off. This difference is specific for the particular reactor and the particular production factors and is determined in preliminary trials. Any measurement of the oxygen content in the reactor and any control resulting therefrom of the inert gas feed for the production is thus unnecessary. As a result, the process is highly cost-effective. The inert gases do not need to be pure, that is to say for example pure nitrogen or pure carbon dioxide, but can also contain small amounts of other components, even a few percent of oxygen. Other components can be principally argon and water, and other trace substances in concentrations below 0.1% by volume. Nitrogen purities of 95 to 99.9% by volume, for example, are sufficient for the inert gas. The inert gas can thus be produced simultaneously on site, for example by membrane separation processes or pressure-swing adsorption processes. A further preferred procedure is obtaining the inert gas from vaporized liquid nitrogen which serves for cryogenic purification of the headspace gas taken off from the reactor. This cryogenic purification comprises condensing out or freezing out, on surfaces cooled by liquid nitrogen, pollutants contained in the headspace gas.

The process according to the invention thus makes possible reliable maintenance of an initially produced base inert-rendering when material is added by opening the vessel. It has economic advantages compared to conventional inert-rendering designs, since oxygen instrumentation can be dispensed with and losses of inert gas and production materials are substantially avoided and the production plant is not fouled by dust formation.

In the context of the invention, the term reactor is taken to mean all suitable vessels such as mixers, silos and devices such as shredders and grinding equipment.

THE DRAWINGS

FIG. 1 shows an apparatus for carrying out the process according to the invention in diagrammatic form, FIG. 2 shows the inert gas lock depicted in FIG. 1 in enlargement, FIG. 3 shows the presentation of practical operating results in graphical form based upon examples 1–4.

DETAILED DESCRIPTION

Figure 1:
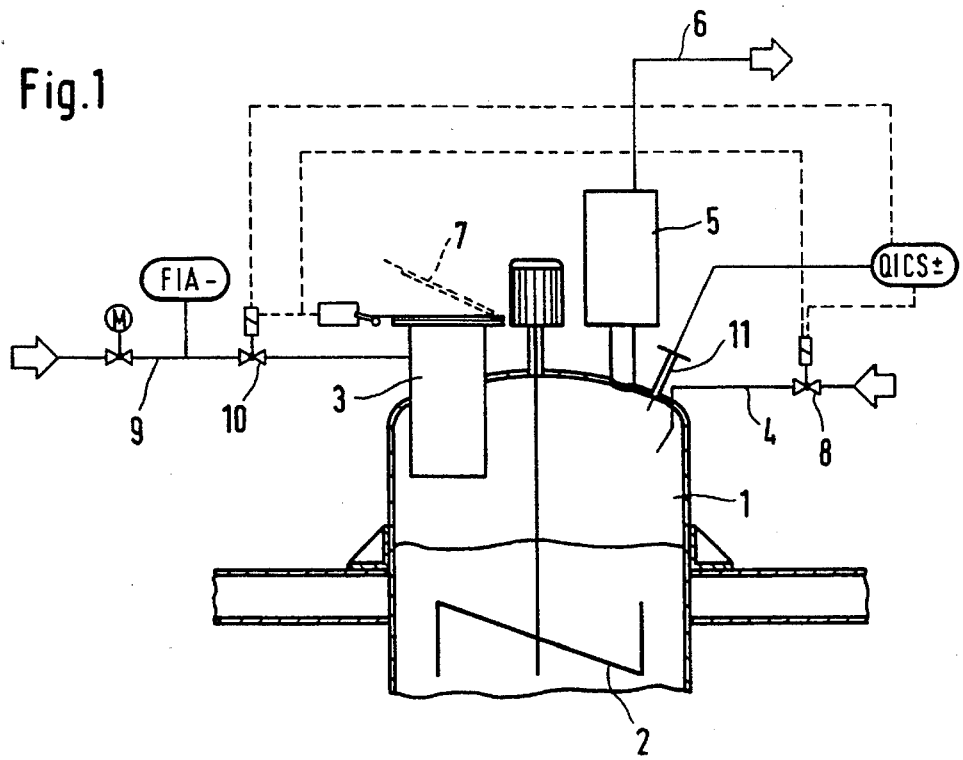

In FIG. 1, a reactor 1 is depicted having an agitator 2 and an inert gas lock 3. The base inert-rendering is carried out by feeding nitrogen through the line 4. The headspace gas is taken off via the purification apparatus 5 through the line 6. When the reactor is opened by opening the cover 7 of the inert gas lock 3, the nitrogen feed through the line 4 is stopped by the shut-off valve 8 and replaced by a nitrogen feed via the line 9 and the shut-off valve 10. In addition, a lance 11 is mounted on the reactor, through which lance gas for analysis can be withdrawn, for example in order to obtain the measurement results presented in FIG. 3.

Figure 2:
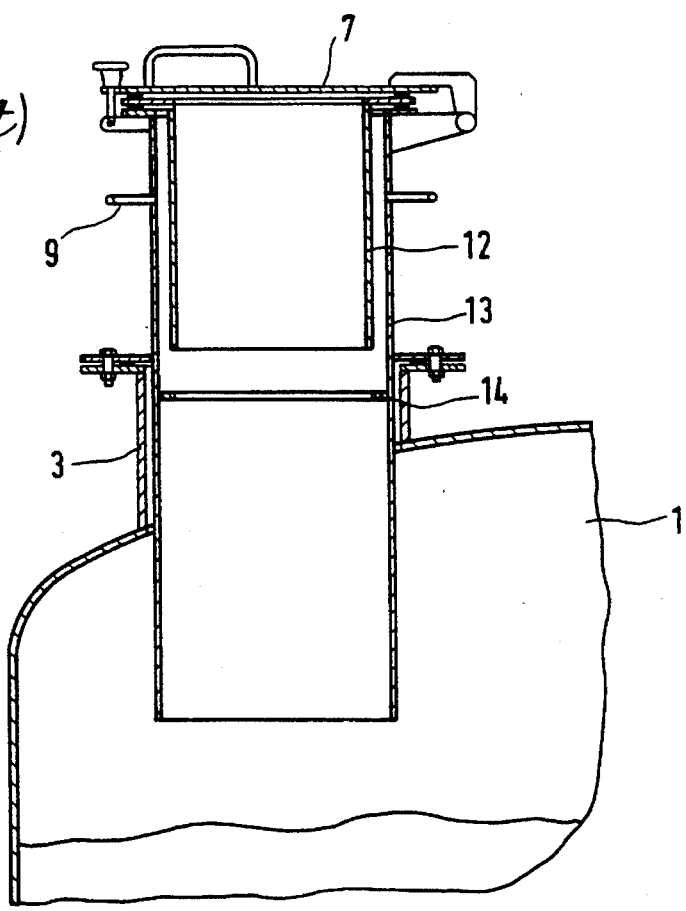

The inert gas lock 3 is shown in FIG. 2 in enlargement. It essentially comprises two concentric tubes 12 and 13 into whose intermediate space, which is gas-tight at the top, the inert gas is injected through the line 9. The inner tube 12 is shorter than the outer tube 13 so that the gas stream has the possibility of expanding in a radial direction. This expansion is supported by the deflection baffle 14. Such inert gas locks are prior art and disclosed, for example, by DE 39 14 783A1.

As a result of a large number of experiments with various embodiments of such inert gas locks, it was established that when such an apparatus is used for introducing inert gas in the vicinity of the vessel port, a defined final value of the residual oxygen content in the vessel is always established. This residual oxygen content does not increase further even when the vessel is open for any desired period of time. The instrumental determination of the residual oxygen content in the vessel can thus be dispensed with without increased risk. The examples below obtained in practice illustrate the potential of the invention and show the most important parameters.

1. A reactor 1 of approximately 650 l headspace volume is furnished according to FIG. 1 with an inert gas lock 3, a line 4 for feeding nitrogen for the base inert-rendering, a line 6 for the removal by suction of exhaust gas and with a lance 11 for the withdrawal of gas for analysis. The line 9 for feeding nitrogen when the cover 7 is open is connected to the inert-rendering lock 3. Addition of nitrogen through the line 4, in combination with the suction through the line 6, produces a base inert-rendering in the closed vessel 1. By opening the cover 7, a nitrogen feed subsequently proceeds through the line 9 instead of line 4, the variable gas flows in the lines 6 and 9 being measured. The most important measured values are:

| | |
|---|---|
| $O_2$ concentration after base inert-rendering | = 2% |
| $N_2$ flow in line 9 | = 15 m³/h |
| Removal through line 6 | = 10 m³/h |
| Nitrogen purity | = 99.99% |
| Final $O_2$ concentration value | = 6% |

2. The above vessel and experiment with the following set data or measured values:

| | |
|---|---|
| $O_2$ concentration after base inert-rendering | = 2% |
| $N_2$ flow in line 9 | = 20 m³/h |
| Removal through line 6 | = 10 m³/h |
| Nitrogen purity | = 99.99% |
| Final $O_2$ concentration value | = 5% |

An increase of the $N_2$ flow produces here only a slight improvement of the final $O_2$ value.

3. The above vessel and experiment with the following set data or measured values:

| | |
|---|---|
| $O_2$ concentration after base inert-rendering | = 2% |
| $N_2$ flow in line 9 | = 13 m³/h |
| Removal through line 6 | = 15 m³/h |
| Nitrogen purity | = 99.99% |
| Final $O_2$ concentration value | = 8% |

A constant final value of the $O_2$ concentration is achieved even when the $N_2$ influx rate is lower than the removal rate, that is the vessel must draw in a certain amount of oxygen-containing external air. If the rate of removal by suction and inert gas flowrate are correctly designed and, in particular, if there is a sufficient addition of inert gas, addition of bulk material proceeds without negative effects such as spreading of dust and vapors.

4. The above vessel and experiment with the following set data or measured values:

| | |
|---|---|
| $O_2$ concentration after base inert-rendering | = 3% |
| $N_2$ flow in line 9 | = 15 m³/h |
| Removal through line 6 | = 10 m³/h |
| Nitrogen purity | = 98%, remainder $O_2$ |
| Final $O_2$ concentration value | = 7% |

The use of lower purity $N_2$ also leads to (comparable) constant final oxygen values.

Figure 3:
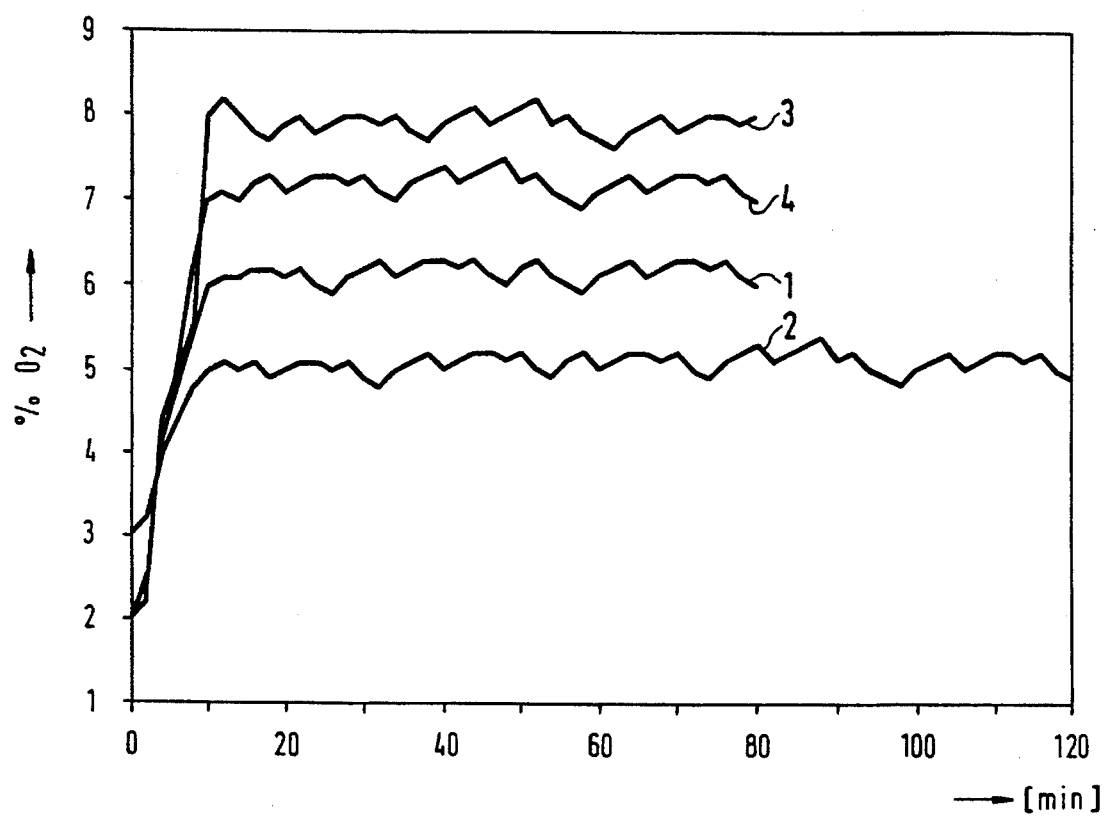

The results of the four test runs are shown in FIG. 3, that is the final $O_2$ concentration values over the period in minutes when the lock is open. It can be clearly seen that the increase in $O_2$ concentration ceases even after less than 10 min. and oscillates about a constant value.

Production factors which can influence the final oxygen concentration value are, without any claim of completeness, principally the vessel volume, the diameter of the lock, the temperature in the reactor and the substances situated in the reactor.

To apply the process according to the invention in practice, the following measures are to be carried out: an inert gas lock having a controllable inert gas feed is installed on the reactor and a suction capacity which can be adjusted in a defined manner is provided. In the course of preliminary trials which also include $O_2$ measurements, inert gas flowrate and extraction rate (headspace gas flowrate) are varied in such a way that a constant final oxygen concentration is established which is below the required residual oxygen content. For economic reasons, the inert gas flowrate is kept as small as possible in this case. In limit cases, the extraction rate can assume a zero value in this case. If a metering rate of the inert gas is found at which the limit oxygen value remains beneath the maximally permissible oxygen content specified for the individual case, the two gas flowrates set must be measured as the only and inexpensive monitoring. The expensive instrumental determination of the residual oxygen content in the reactor can be dispensed with. The values obtained then apply only to the particular inert gas, production of the particular substance and only for the particular vessel. For other productions and other vessels, values for extraction rate and inert gas flowrate apply which must be determined separately.

What is claimed is:

1. A process for rendering reactors to be inert, wherein the reactors contain flammable substances and are open at least temporarily by an inert gas fed to the reactor in the open state via an inert gas lock, with simultaneous removal of headspace gas, which comprises providing a reactor containing flammable substances and having an inert gas lock, establishing and maintaining a predetermined difference between inert gas flowrate and headspace gas flowrate removed from the reactor, maintaining the difference without use of an instrumental determination of the oxygen content in the reactor, and with the difference being determined in advance.

2. A process as claimed in claim 1, wherein the inert gas is generated on site.

3. The process as claimed in claim 2, wherein the inert gas is obtained from vaporized liquid nitrogen with which is carried out at the same time as a cryogenic purification of the headspace gas.

4. A process for rendering reactors to be inert wherein the reactors contain flammable substances and are open at least temporarily by an inert gas fed to the reactor in the open state via an inert gas lock, with simultaneous removal of headspace gas which contains oxygen from the reactor, comprising providing a reactor containing flammable substances and having an inert gas lock, feeding an inert gas into the reactor at a controllable flow rate, withdrawing headspace gas from the reactor at a controllable flow rate, varying the inert gas feed flowrate and the headspace gas extraction flowrate to establish a constant oxygen concentration in the reactor which is below a required residual oxygen content, maintaining the constant oxygen concentration by measuring the flowrates of the inert gas and of the headspace gas as the sole monitoring to thereby avoid the use of instrumental determination of the residual oxygen content in the reactor, and setting the constant oxygen concentration in advance based upon production factors for that particular reactor.

5. A process as claimed in claim 4, wherein the extraction flowrate is zero.

* * * * *